(12) United States Patent
Hall et al.

(10) Patent No.: US 10,281,015 B2
(45) Date of Patent: *May 7, 2019

(54) CORNER RACK (71) Applicant: Hall Labs LLC, Provo, UT (US)

(72) Inventors: David R. Hall, Provo, UT (US);
Jackson Priddis, Orem, UT (US);
Andrew Priddis, Mapleton, UT (US);
Eimi Priddis, Mapleton, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/185,496

(22) Filed: Jun. 17, 2016

(65) Prior Publication Data
US 2017/0363186 A1 Dec. 21, 2017

(51) Int. Cl.
B66B 9/02 (2006.01)
B66B 11/00 (2006.01)
B66B 11/04 (2006.01)
F16G 13/04 (2006.01)
F16H 19/04 (2006.01)
F16H 19/06 (2006.01)
F16H 55/08 (2006.01)
F16H 55/26 (2006.01)

(52) U.S. Cl.
CPC ............ *F16H 19/04* (2013.01); *B66B 9/022* (2013.01); *B66B 11/0045* (2013.01); *B66B 11/0469* (2013.01); *F16H 19/06* (2013.01); *F16H 55/08* (2013.01); *F16H 55/26* (2013.01); *F16G 13/04* (2013.01); *F16H 2019/0681* (2013.01)

(58) Field of Classification Search
CPC ... B66B 9/022; B66B 9/0815; B66B 11/0469; B66B 11/0461; F16H 19/06; F16H 19/04; F16H 2019/0613
USPC ........................................................ 187/270
See application file for complete search history.

(56) References Cited

U.S. PATENT DOCUMENTS

| | | | | |
|---|---|---|---|---|
| 651,236 A * | 6/1900 | Corcoran | ............ | B66B 11/0469 187/250 |
| 828,029 A * | 8/1906 | Jackson | .................. | B66B 9/022 187/271 |
| 966,231 A * | 8/1910 | Newson | .................. | B66B 9/022 187/271 |
| 1,140,319 A * | 5/1915 | Van Houten | .............. | F16H 7/06 305/202 |
| 1,902,946 A * | 3/1933 | Breed | ........................ | B66B 9/10 187/270 |
| 3,313,376 A * | 4/1967 | Holland, Sr. | ........... | B66B 9/022 182/129 |
| 3,384,031 A * | 5/1968 | Dashew | .................. | B61B 13/10 104/138.1 |
| 3,399,578 A * | 9/1968 | Lindabury, Sr. | .......... | F16H 7/06 254/95 |

(Continued)

*Primary Examiner* — Minh Truong (57) ABSTRACT

The invention is a corner rack with one front face that has teeth. A corner rack is a linear gear interface that can be placed in corners, such that the teeth face out from the corner at an angle, rather than running parallel with the walls. The teeth of the corner rack have a profile that can engage with the profile of a silent chain. The combination of the corner rack and silent chain allows an attached motor to be distanced from the corner rack, so that a lifting device driven by the corner rack and silent chain can be placed in and utilized in corners. This leads to increased versatility and efficiency.

16 Claims, 11 Drawing Sheets (56) References Cited

U.S. PATENT DOCUMENTS

| | | | | |
|---|---|---|---|---|
| 3,824,871 A * | 7/1974 | Loesch | ................... | F16H 19/04 74/37 |
| 5,191,920 A * | 3/1993 | McGregor | .............. | B65B 43/59 141/114 |
| 5,452,774 A * | 9/1995 | Davis | ................. | B66B 11/0469 187/270 |
| 5,819,584 A * | 10/1998 | Evans | ..................... | F16H 19/06 474/140 |
| 6,171,209 B1 * | 1/2001 | Matsuda | ................ | F16G 13/04 474/212 |
| 7,229,375 B2 * | 6/2007 | Hummel | ................ | F16G 13/04 474/213 |
| 8,863,907 B2 * | 10/2014 | Studer | .................... | B66B 9/022 187/270 |
| 2007/0034453 A1 * | 2/2007 | Kim | ....................... | B66B 9/022 187/391 |

\* cited by examiner

CORNER RACK

CROSS-REFERENCES

TECHNICAL FIELD

This invention relates generally to the field of lifting devices, and more specifically to racks.

BACKGROUND

The lifting capacity of an average person amounts to a few hundred pounds. For this reason, people have turned for centuries to mechanical means of lifting heavy items. Some of the means devised include pulley systems, cranes, scissor lifts, or linear actuators. One type of linear actuator of particular interest here is a rack and pinion device.

Elevators generally utilize a pulley-type system. Usually, a cable is attached to the top of an elevator box, and a counterweight is attached to the free end of the cable. The elevator box moves up and down within an elevator shaft when the cable is engaged by a motor. Safety devices are in place in the event that the cable breaks.

Though this basic system has been used for decades, there are disadvantages inherent in the pulley system method for lifting an elevator. First, the distance that an elevator can travel is limited by the length of the cable. Second, and even more importantly, the method does not maximize efficiency or cost of materials, which is desirable in the construction of green and sustainable buildings. When an elevator is lifted from the top by means of a cable, the elevator box plays an important structural role in the lifting. The box must be built for strength and stability, so that the elevator box floor is securely attached to the elevator box ceiling, where the cable is attached. On the other hand, if an elevator box were lifted from the bottom, the structure of the elevator box would be insignificant. Lighter and cheaper materials could be used to form the elevator box because the top portion of the box would not need to bear weight. In turn, the motor would not require as much power to lift the elevator if the elevator box were created from lighter materials. The machine room where the motor is stored in the case of traditional elevators could be eliminated. Furthermore, an additional structure extending the elevator shaft above the rooftop to allow access to the roof would be unnecessary. Therefore, a better elevator design would incorporate lifting from the bottom using other mechanical means.

One device that could conceptually be used for lifting an elevator from the bottom is a rack and pinion device. Rack and pinion devices are configured to convert rotational motion to linear motion. They are often used for creating horizontal linear motion, such as in transport, packaging, and assembly machines, but rack and pinion devices are also used for vertical linear motion. However, when lifting heavy items vertically, rack and pinion devices have some disadvantages. First, rack and pinion devices normally have only a few points of contact between the rack and the pinion. If a rack and a pinion have contact at only a few points, those points of contact may be put under disproportionate amounts of stress when lifting, which could cause the rack and pinion device to fail. Because reliability or safety are chief concerns in creating an elevator, taking chances with parts that might break under load could lead to disastrous results. This problem is sometimes solved by increasing the size and, therefore, the load capacity of the rack and pinion, but larger parts are harder to manufacture, require more space, and cost more. A larger rack and pinion also might require a larger motor, which further leads to decreased efficiency.

One other issue with rack and pinion devices is that these devices generally are not placed in corners. That is because the motor extending out from the pinion is generally too large to fit in the space available within the angle of the corner. This limits the versatility of the devices. In an elevator shaft, because rack and pinion devices cannot be placed in corners, they would necessarily be placed along the sides, which would limit the potential space available for access to the elevator. Furthermore, placing racks along the sides would not enhance the structure of the elevator shaft, whereas putting a rack in a corner would allow the rack to be part of the structure.

These problems could potentially be solved if the elevator were driven by a rack and chain device. A rack and chain device would allow the elevator to be lifted from the bottom, as with a rack and pinion device. However, replacing a pinion with a silent chain would allow the points of contact with the rack to be increased, taking pressure off of each individual tooth. A silent chain would also allow the motor to be distanced from the rack, so that the device could be placed in corners. In spite of this latter benefit, one further problem remains: racks are not configured for placement in corners.

In light of the foregoing, what is needed is a rack that can be placed in corners. Such a rack would allow for vertical linear lifting in corners, thus increasing the versatility of a rack and chain device and compounding the advantage that a rack and chain device would have over a rack and pinion device. The rack would also need to have a profile that could engage with the profile of a silent chain.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow for lifting using a corner rack and silent chain device in a corner.

Consistent with the foregoing, an apparatus is disclosed. The apparatus comprises a corner rack. A corner rack is a linear gear interface positioned in a corner. The corner rack comprises a front face, the front face comprising teeth, and the teeth comprising a profile that can engage with a profile of a silent chain. When the corner rack engages with a silent chain, vertical linear motion is created for lifting in corners.

In one embodiment, the corner rack has a truncated cubic configuration. Parallel to the front face there is a point where two back faces join at an angle formed by a corner in which the corner rack is mounted. In another embodiment, the corner rack has a trapezoid configuration. Parallel to the front face is a flat face, and the flat face is positioned in a corner. In another embodiment, the corner rack has a cubic configuration, and the corner rack is displaced within and secured by a bracket with a truncated cubic configuration. Parallel to the front face of the corner rack is a point where two back faces join at an angle formed by a corner in which the corner rack is mounted. In some embodiments, the corner rack is tubular. In some embodiments, the corner rack has a center guide indentation that can correspond with center guide link plates of a silent chain, preventing the silent chain from slipping when it engages with the corner rack.

BRIEF DESCRIPTION OF THE DRAWINGS

A more particular description of the invention briefly described above is made below by reference to specific embodiments depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

The invention is an apparatus comprising a corner rack, the corner rack comprising a front face, and the front face comprising teeth. A corner rack is a linear gear interface positioned in a corner, such that the front face and teeth extend outward at an angle to, rather than running parallel to, walls that form a corner, as depicted in FIG. 1.

Figure 1:
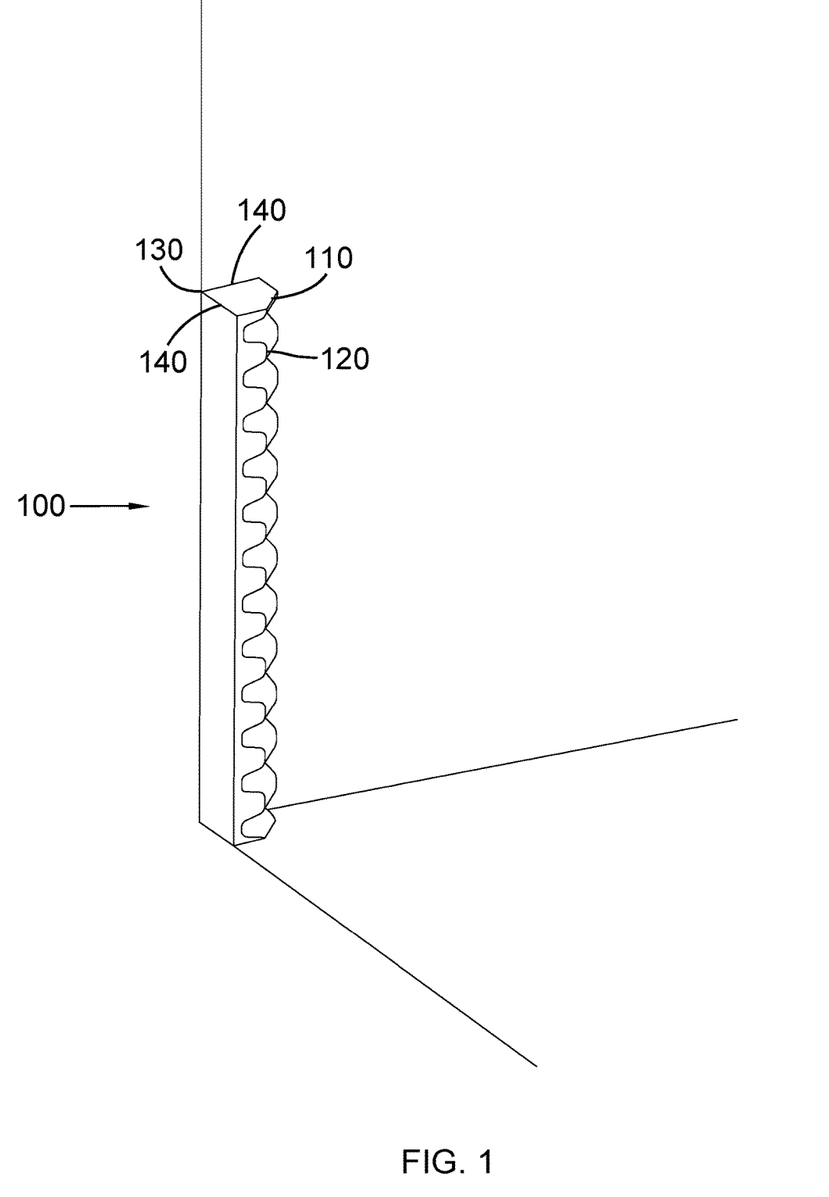
FIG. 1 depicts a perspective view of one embodiment of the corner rack.

FIG. 1 depicts one embodiment of a corner rack 100. The corner rack comprises front face 110, which comprises teeth 120. The front face 110 and teeth 120 extend outward at an angle to, rather than running parallel to, walls that form a corner. Furthermore, the teeth 120 comprise a profile that can engage with a profile of a silent chain. In one embodiment, in order for a profile of the teeth 120 to engage with a profile of a silent chain, a pitch measurement of the corner rack 100 measures between about 0.345 and 0.79 inches, preferably measuring between about 0.41 and 0.63 inches, more preferably measuring between about 0.48 and 0.58 inches. The pitch of the corner rack 100 must be slightly bigger than the distance between central pivot points within each pin hole of link plates of a silent chain in order for the profile of the corner rack 100 to engage with the profile of a silent chain. Moreover, the teeth 120 of the corner rack 100 extend from a main body of the corner rack at an angle between about 90 and 130 degrees, preferably between about 110 and 120 degrees, more preferably between 105 and 115 degrees. In the embodiment of the corner rack 100 depicted in FIG. 1, the corner rack 100 has a truncated cubic configuration. Parallel to the front face 110 is a point 130 where two back faces 140 join at an angle formed by a corner in which the corner rack is mounted.

Figure 2:
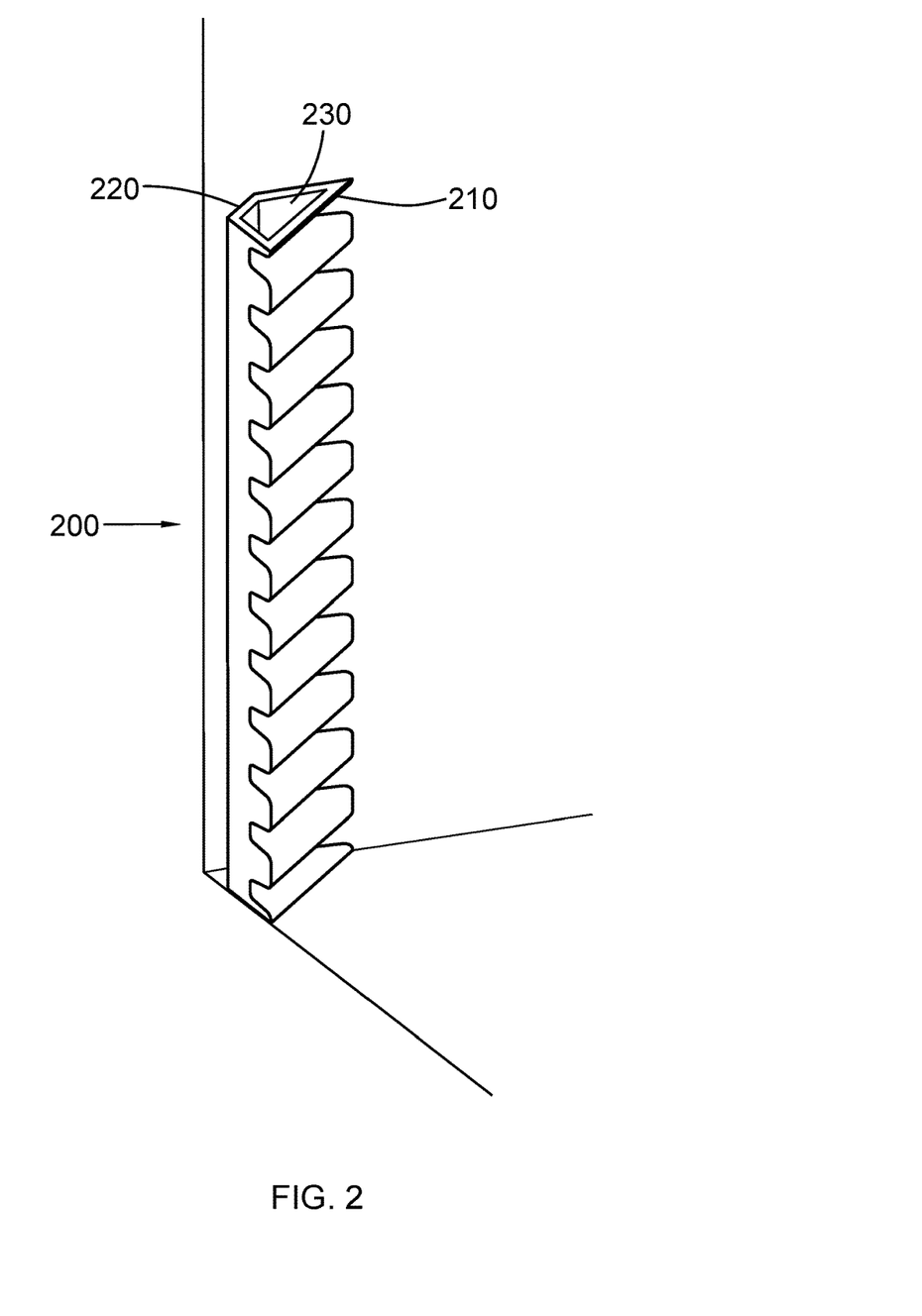
FIG. 2 depicts a perspective view of one embodiment of the corner rack.

FIG. 2 depicts another embodiment of the corner rack 200. In this embodiment, the corner rack 200 has a trapezoid configuration. Parallel to a front face 210 is a shorter flat face 220. The flat face 220 is positioned in a corner. FIG. 2 also depicts one embodiment of the corner rack 200 in which the corner rack 200 is tubular. A tubular configuration allows the hollow center 230 of the corner rack 200 to be utilized for other purposes, such as for storing utility lines.

Figure 3:
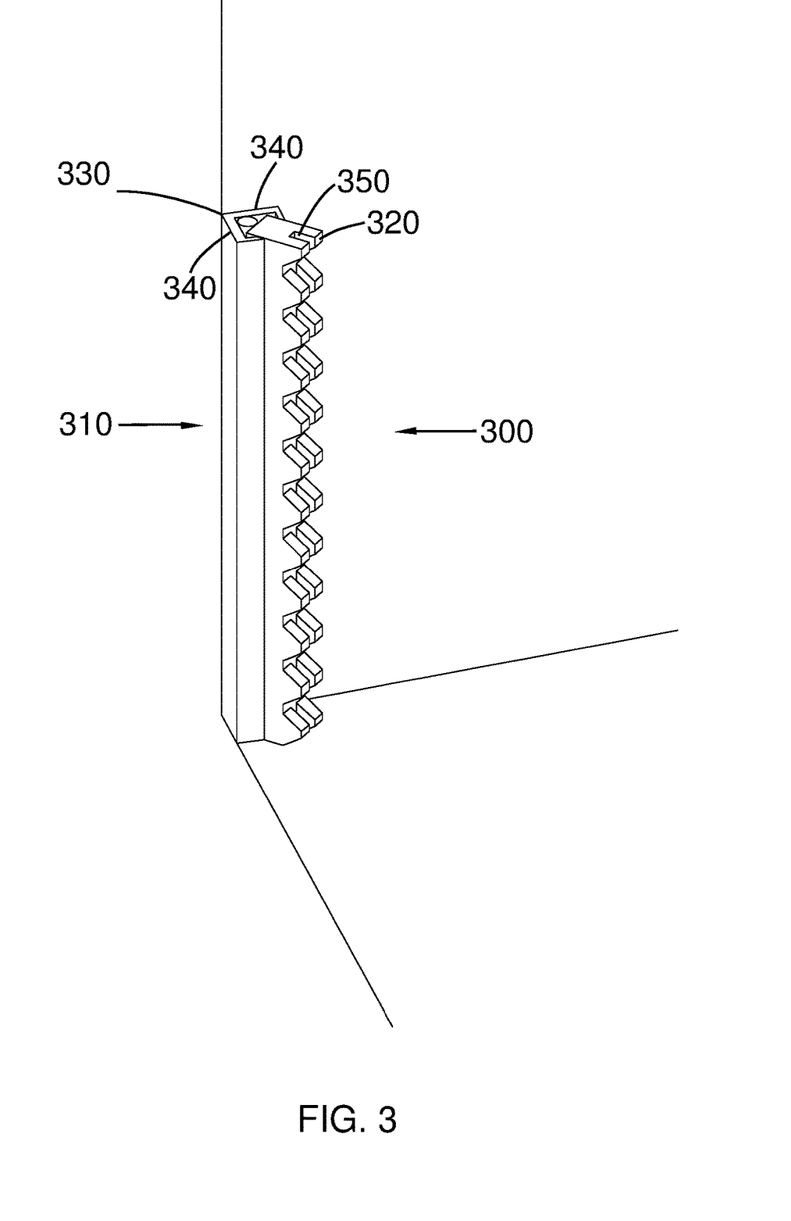
FIG. 3 depicts a perspective view of one embodiment of the corner rack.

FIG. 3 depicts another embodiment of the corner rack 300. In this embodiment, the corner rack 300 has a cubic configuration. The corner rack 300 is displaced within and secured by a bracket 310 with a truncated cubic configuration. Parallel to the front face 320 is a point 330 where two back faces 340 of the bracket 310 join at an angle formed by a corner in which the corner rack is mounted. FIG. 3 also depicts one embodiment of the corner rack 300, in which the corner rack 300 has a center guide indentation 350 that corresponds with center guide link plates of a silent chain, in order to prevent the silent chain from slipping when it engages with the corner rack 300.

Figure 4:
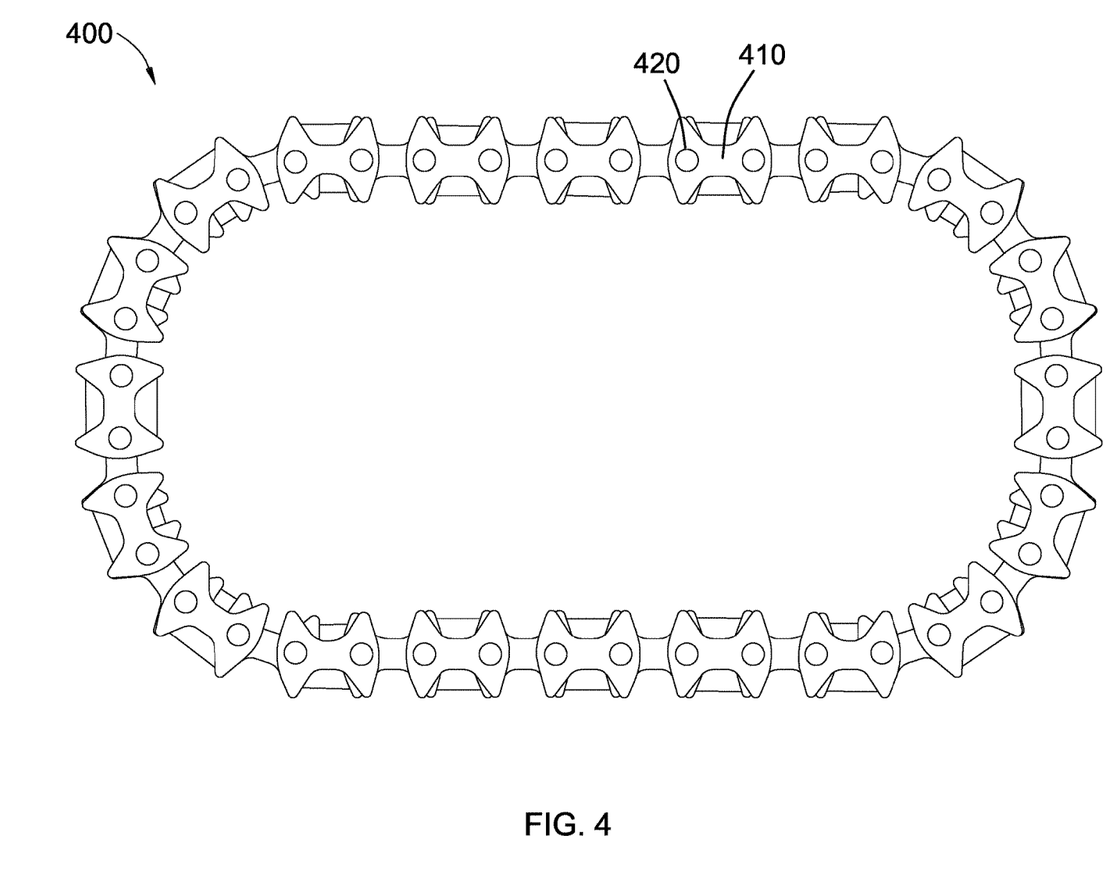
FIG. 4 depicts a perspective view of a silent chain having a profile that can engage with the corner rack.

FIG. 4 depicts one embodiment of a silent chain 400 that has a profile that can engage with a profile of a corner rack. Silent chain 400 comprises a plurality of link plates 410 and a plurality of connecting pins 420. The link plates 410 are stacked in alternating rows and bendably joined together with the connecting pins 420.

Figure 5:
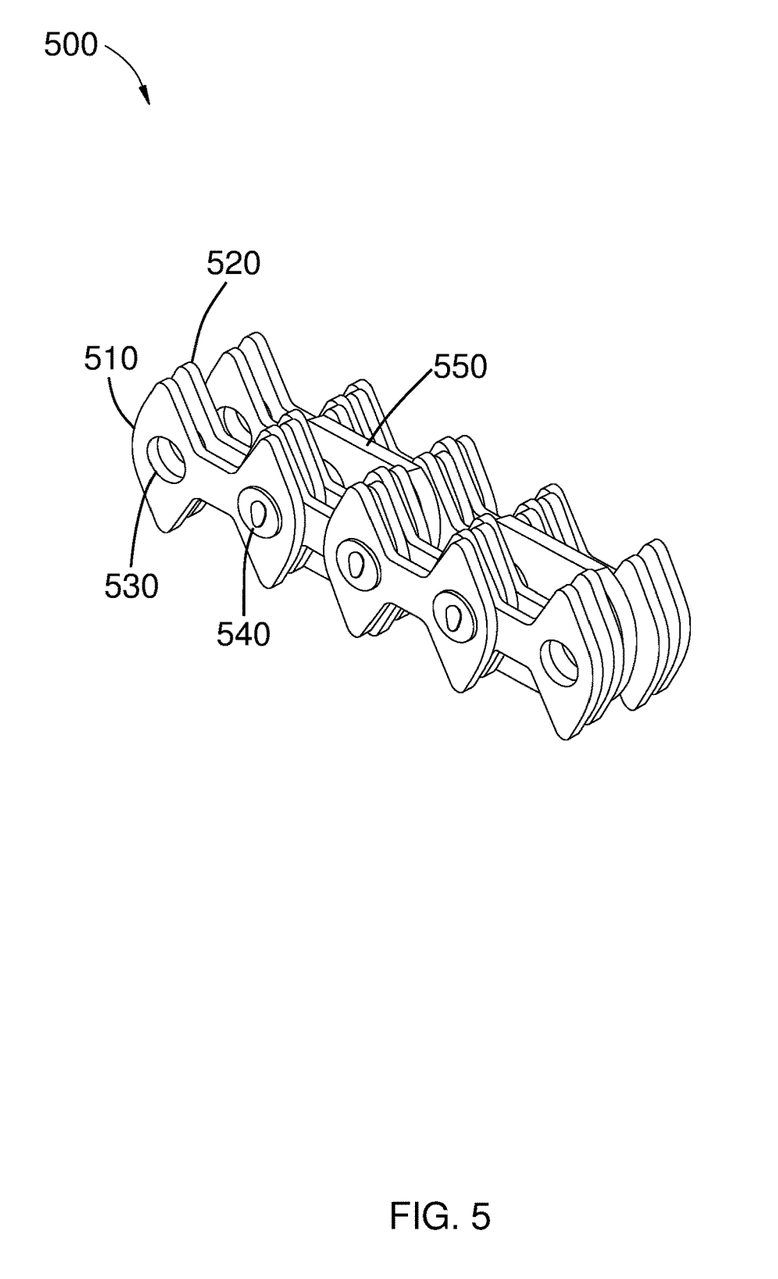
FIG. 5 depicts an exploded view of a silent chain having a profile that can engage with the corner rack.

FIG. 5 depicts a closer side view of a silent chain 500 that has a profile that can engage with a profile of a corner rack. The link plates 510 each have at least four teeth 520 and two pin holes 530. The link plates 510 are joined together by inserting the connecting pins 540 through the pin holes 530. In one embodiment, the silent chain 500 also has center guide link plates 550 that can be seen centrally positioned between alternating rows of link plates. The center guide link plates 550 correspond with center guide indentations in one embodiment of the corner rack, in order to prevent the silent chain 500 from slipping when it engages with the corner rack. The silent chain 500 has a variable length and a variable amount of alternating link plates. In one embodiment of silent chain 500, there are eight alternating rows of link plates, plus center guide link plates 550. In other embodiments, silent chain 500 has any number of alternating rows of link plates. The teeth of each link plate are shaped in such a way that the teeth of a first row selection of link plates and the teeth of a second row selection of link plates are offset when the silent chain 500 is straightened. Therefore, a profile of the silent chain 500 can correspond with the profile of a corner rack.

Figure 6:
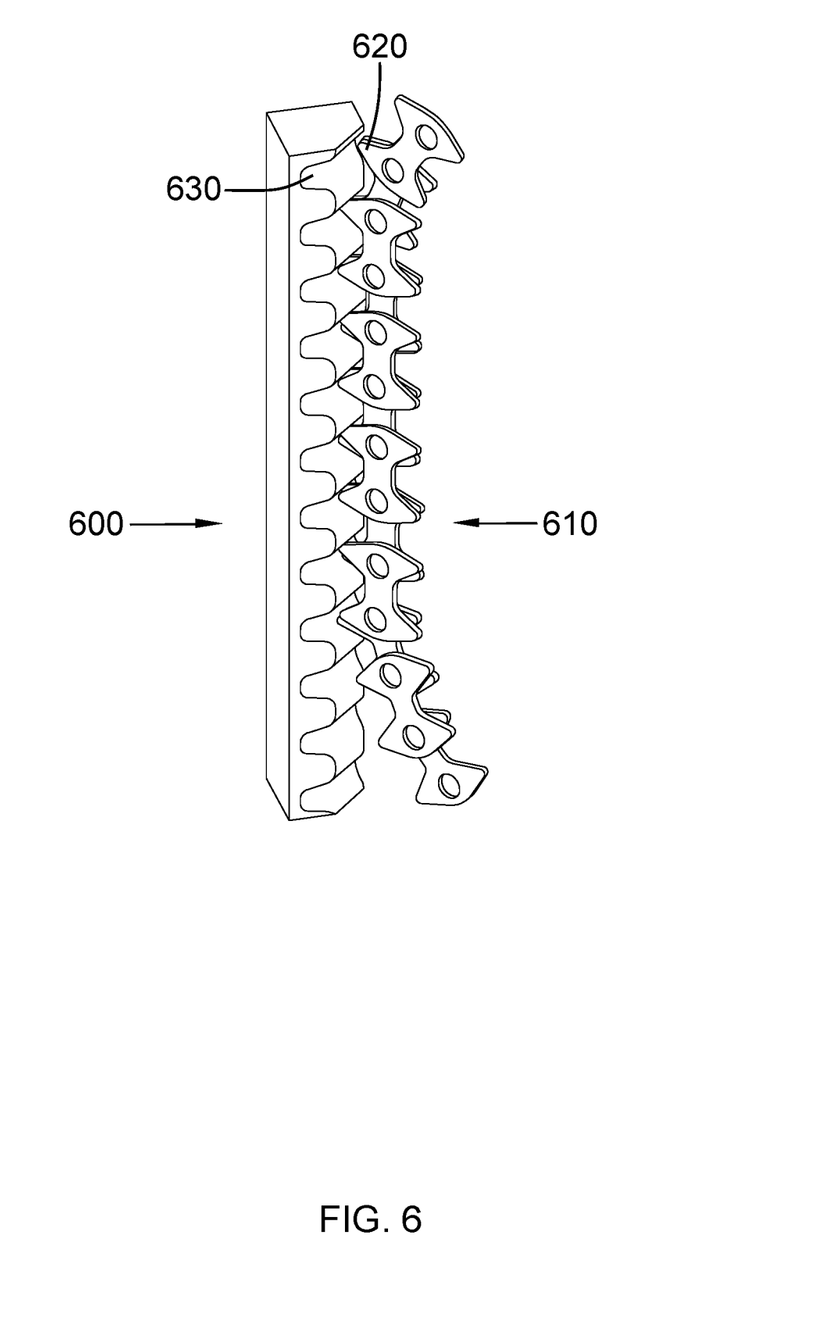
FIG. 6 depicts a perspective view of the corner rack and silent chain engaging with each other.

FIG. 6 depicts the profile of one embodiment of corner rack 600 engaging with a silent chain 610. The profile of corner rack 600 corresponds with the profile of silent chain 610. The teeth 620 of the link plates of silent chain 610 are shaped in such a way that the teeth 620 are offset when the silent chain 610 is straightened. However, as the teeth 620 approach corner rack 600 to engage with corner rack 600, the silent chain 610 is bent, and an upper portion of the teeth 620 align. Because the teeth 620 align, the teeth 620 become small enough to fit within a corresponding groove 630 of the corner rack 600. After the silent chain 610 is straightened, the teeth 620 are drawn apart, such that they return to their original offset position, filling the groove 630 of center rack 600. In this way, a silent chain 610 is able to engage with a corner rack 600.

Figure 7:
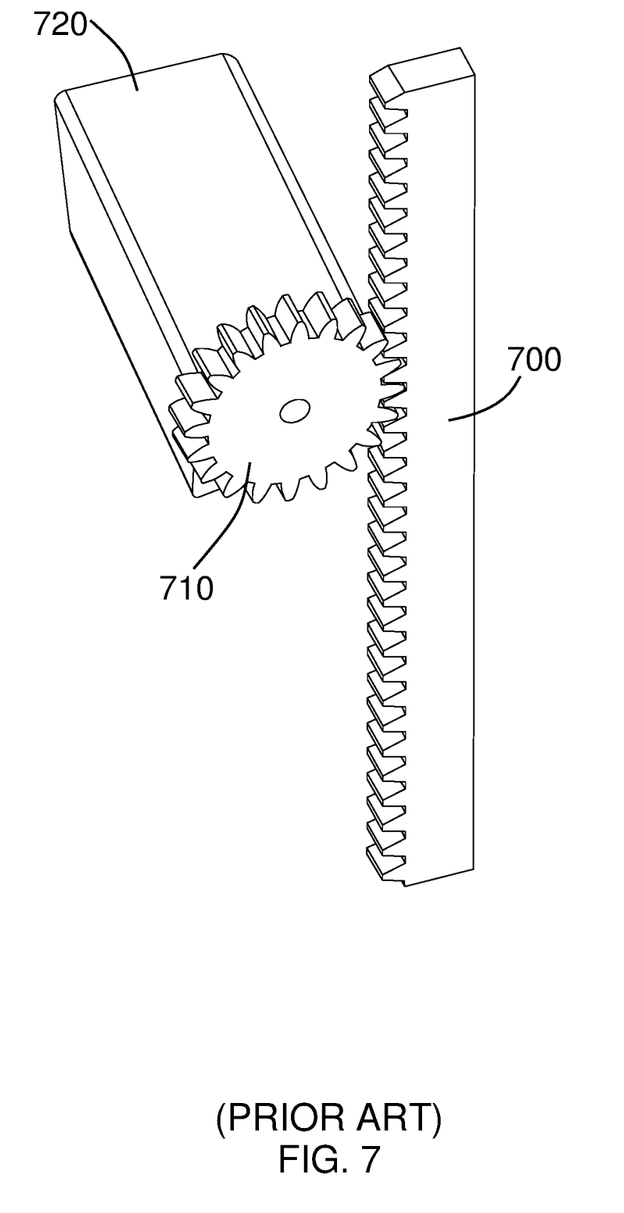
FIG. 7 depicts a perspective view of a rack and pinion device.

FIG. 7 depicts a prior art rack and pinion device comprising a rack 700 and a pinion 710. Connected to the pinion 710 is a motor 720. The motor 720 drives the pinion 710 up the rack 720, converting rotational motion to linear motion.

Figure 8:
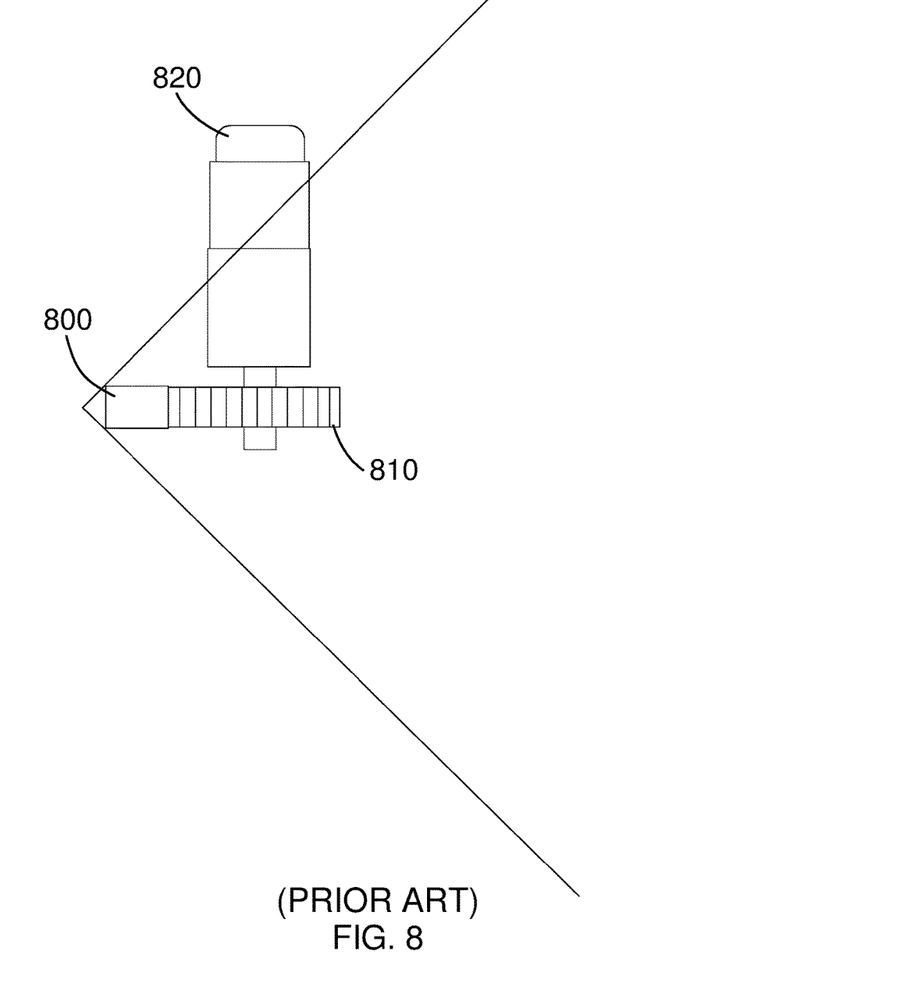
FIG. 8 depicts a perspective view of a rack and pinion device in a corner.

FIG. 8 depicts a rack and pinion device comprising a rack 800, a pinion 810, and a motor 820 in a corner. Rack and pinion devices generally are not placed in corners because the motor 820 extending out from the pinion 810 is generally too large to fit in a space available within an angle of a corner. This problem could be solved by adding gears between the rack 800 and the pinion 810, but that would increase cost and reduce efficiency. A superior solution is to use a corner rack and a silent chain.

Figure 9:
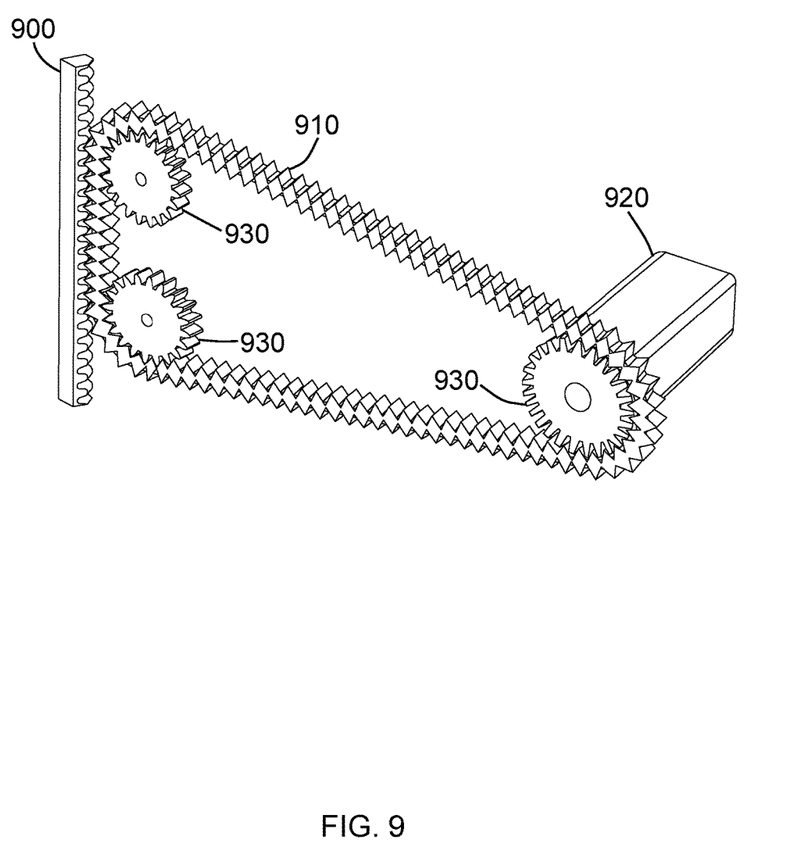
FIG. 9 depicts a perspective view of one embodiment of a corner rack and silent chain device.

FIG. 9 depicts one embodiment of a corner rack and silent chain device comprising a corner rack 900 and a silent chain 910. The corner rack 900 has a profile that can engage with a profile of a silent chain 910. In one embodiment, the corner rack and silent chain device further comprises a motor 920 and a plurality of gears 930. The silent chain 910 is wrapped around each of the gears 930 and the motor 920 is connected to and drives the gears 930 and the silent chain 910. The motor 920 should be distanced from the rack 900 to the extent that allows the silent chain 910 to be fully extended. The corner rack 900, the silent chain 910, the motor 920, and the gears 930 are positioned such that the silent chain 910 can engage with the corner rack 900, and the motor 900 can drive the silent chain 910 up the rack 900, converting rotational motion to linear motion.

Figure 10:
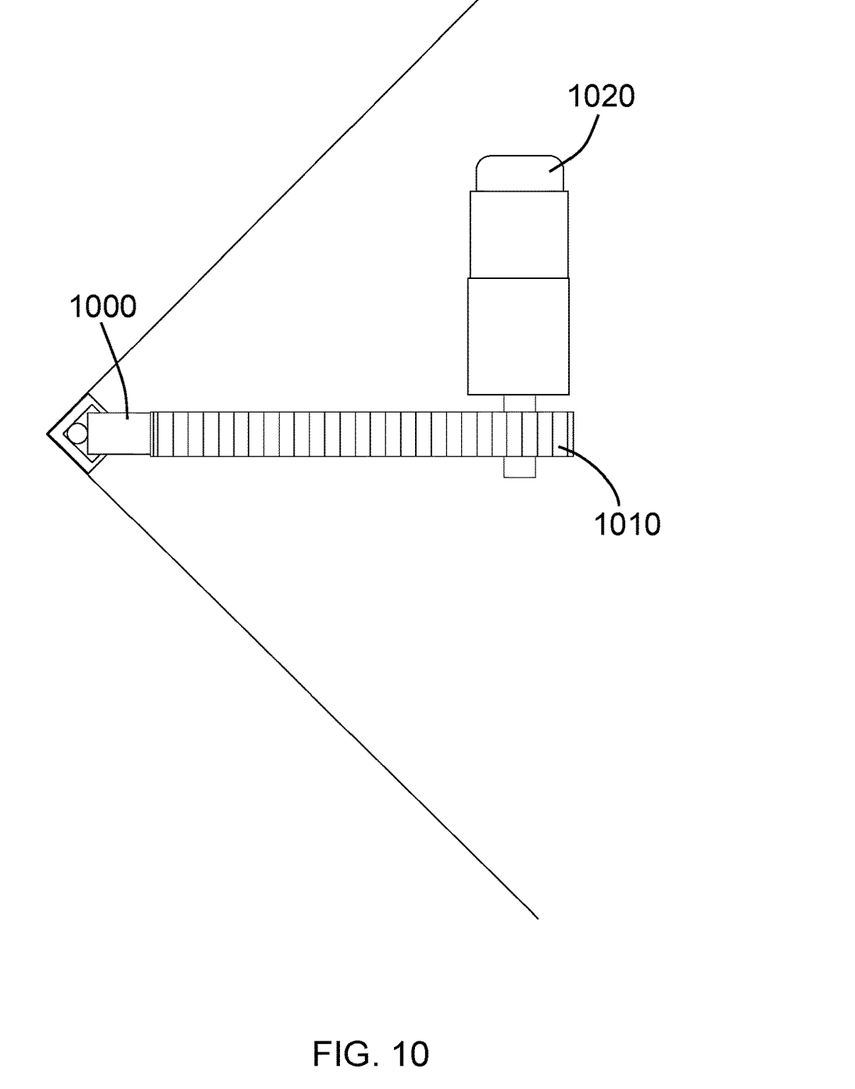
FIG. 10 depicts a perspective view of a corner rack and silent chain device in a corner.

FIG. 10 depicts one embodiment of a corner rack and silent chain lifting device, comprising a corner rack 1000 and a silent chain 1010 attached to a motor 1020, in a corner. In the corner rack and silent chain lifting device, the corner rack 1000 engaging with the silent chain 1010, rather than a rack engaging with a pinion, allows the motor 1020 to be distanced from the corner rack 1000, as far away as the length of the silent chain 1010 allows. The combination of the corner rack 1000 and the silent chain 1010, which allows the motor 1020 to be distanced from the corner rack 1000, allows the corner rack and silent chain lifting device to be placed in and utilized in corners.

Figure 11:
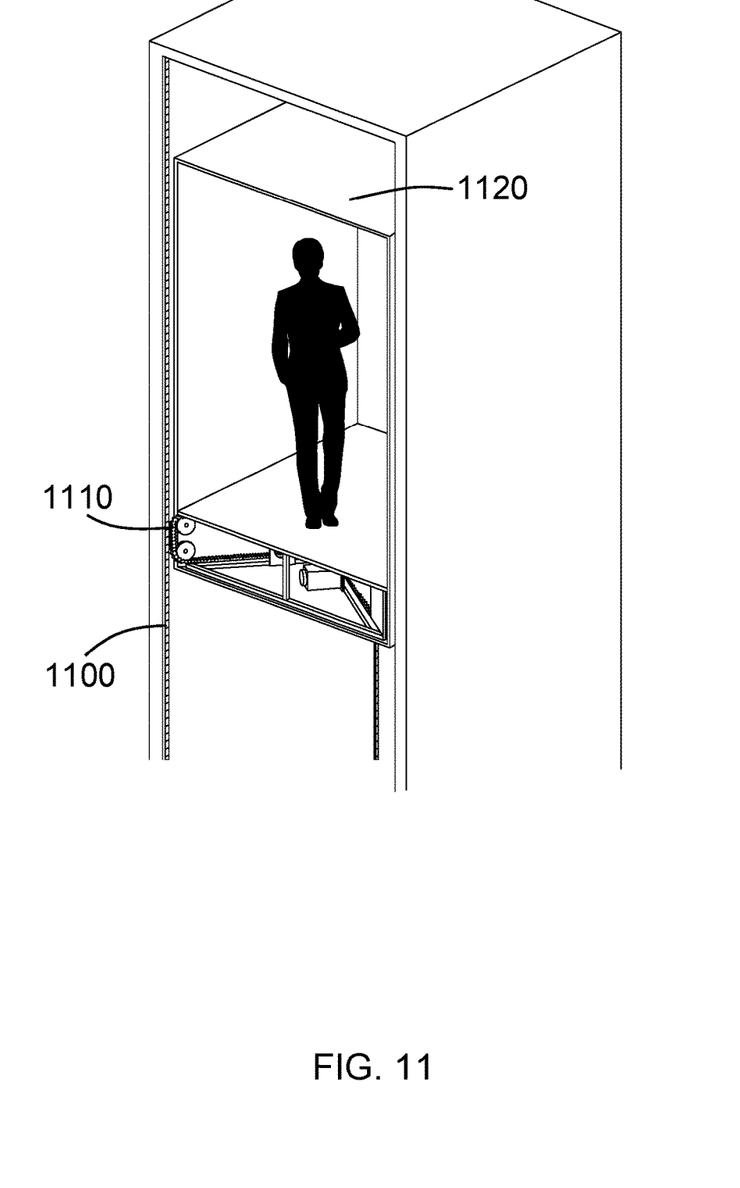
FIG. 11 depicts a perspective view of a corner rack and silent chain device in a corner driving an elevator.

FIG. 11 depicts one embodiment of a corner rack and silent chain lifting device, comprising a corner rack 1100 and a silent chain 1110 in a corner driving one embodiment of an elevator 1120. The combination of the corner rack and the silent chain allows the corner rack and silent chain lifting device to be placed in and utilized in corners. This leads to increased versatility, such that the corner rack and silent chain lifting device can be used in applications where rack and pinion devices cannot be efficiently used, such as in driving an elevator from the bottom. The position of the corner rack and silent chain device in the corner keeps the corner rack and silent chain device out of the way of access to the elevator. Therefore, the elevator can be accessed from all directions.

The invention claimed is:

1. A transmission system comprising:
   a silent chain having a first row of link plate and a second row of link plate, each link plate in the first row of link plates comprising first link plate teeth and each link pate in the second row of link plates comprising second link plate teeth, wherein the first link plate teeth and the second link plate teeth having different shape profile with repect to each other;
   a corner rack, the corner rack comprising a front face, the front face comprising teeth, the teeth comprising a profile that engages with the silent chain;
   a set of gears that bends the silent chain as the silent chain enters the teeth of the corner rack, that draws the chain straight to engage the first link plate teeth and the second link plate teeth with the teeth of the corner rack, and that bends the silent chain as the silent chain exits the teeth of the corner rack,
   wherein the first link plate teeth and the second link plate teeth are longitudinally offset with respect to each other when the silent chain is strenghtened, and
   wherein a tooth of the first link plate teeth and a tooth of the second link plate teeth are longitudinally aligned with respect to each other at a bend as the silent chain is bent by the set of gears.

2. The transmission system of claim 1, wherein the corner rack has a truncated cubic configuration, and parallel to the front face, a point where two back faces join at an angle formed by a corner in which the corner rack is mounted.

3. The transmission system of claim 1, wherein the corner rack has a trapezoid configuration, and parallel to the front face, a flat face, and the flat face positioned in a corner.

4. The transmission system of claim 1, wherein the corner rack has a cubic configuration, and the corner rack is displaced within and secured by a bracket with a truncated cubic configuration, and parallel to the front face of the corner rack, a point where two back faces of the bracket join at an angle formed by a corner in which the corner rack is mounted.

5. The transmission system of claim 1, wherein the corner rack is tubular.

6. The transmission system of claim 1, wherein a pitch measurement of the corner rack measures between about 0.345 and 0.79 inches.

7. The transmission system of claim 1, wherein a pitch measurement of the corner rack measures between about 0.41 and 0.63 inches.

8. The transmission system of claim 1, wherein a pitch measurement of the corner rack measures between about 0.48 and 0.58 inches.

9. The transmission system of claim 1, wherein the teeth of the corner rack extend from a main body of the corner rack at an angle between about 90 and 130 degrees.

10. The transmission system of claim 1, wherein the teeth of the corner rack extend from a main body of the corner rack at an angle between about 110 and 120 degrees.

11. The transmission system of claim 1, wherein the teeth of the corner rack extend from a main body of the corner rack at an angle between 105 and 115 degrees.

12. The transmission system of claim 1, wherein the teeth engage with the silent chain, such that the silent chain is driven along the track as a motor drives the silent chain.

13. The transmission system of claim 1, wherein the silent chain comprises a plurality of link plates and a plurality of connecting pins.

14. The transmission system of claim 13, wherein each link plate comprises at least four link plate teeth.

15. The transmission system of claim 1, wherein the silent chain comprises stacked rows of link plates.

16. The transmission system of claim 1, wherein the tooth of the first link plate teeth and the tpooth of the second link plate teeth fill a groove of the corner rack when the silent chain is straightened.

* * * * *